United States Patent
Wingerter et al.

(10) Patent No.: US 11,608,690 B2
(45) Date of Patent: Mar. 21, 2023

(54) MUD MOTOR/BHA COMPRESSION SAFETY CATCH

(71) Applicant: Alliance OFS Solutions LLC, Conroe, TX (US)

(72) Inventors: Rodney M. Wingerter, Conroe, TX (US); Jawad A. Alsadah, Conroe, TX (US)

(73) Assignee: Quantum Energy Technologies LLC, Houston, TX (US)

( * ) Notice: Subject to any disclaimer, the term of this patent is extended or adjusted under 35 U.S.C. 154(b) by 0 days.

(21) Appl. No.: 17/306,503

(22) Filed: May 3, 2021

(65) Prior Publication Data

US 2021/0348650 A1    Nov. 11, 2021

Related U.S. Application Data

(60) Provisional application No. 63/022,850, filed on May 11, 2020.

(51) Int. Cl.
*E21B 17/02* (2006.01)
*F16C 19/04* (2006.01)
*E21B 4/00* (2006.01)

(52) U.S. Cl.
CPC .............. *E21B 17/02* (2013.01); *E21B 4/003* (2013.01); *F16C 19/04* (2013.01)

(58) Field of Classification Search
CPC ........ E21B 17/02; E21B 17/041; E21B 4/003; F16C 33/605
See application file for complete search history.

(56) References Cited

U.S. PATENT DOCUMENTS

2017/0260814 A1* 9/2017 Gharib .................. E21B 17/006

* cited by examiner

*Primary Examiner* — Kristyn A Hall
(74) *Attorney, Agent, or Firm* — Phillip Black

(57) ABSTRACT

A safety catch assembly design to prevent loss of drilling components during downhole operation is disclosed. The safety catch assembly can include a lower inner radial bearing comprising a catch ring retention zone. The safety catch assembly can also include one or more catch rings removably disposed in the catch ring retention zone, including a first catch ring having one or more ridges about its inner diameter and a second catch ring having one or more ridges about its inner diameter. In a locked position, the catch rings can retain the drilling components during a failure event.

17 Claims, 5 Drawing Sheets

MUD MOTOR/BHA COMPRESSION SAFETY CATCH

FIELD OF INVENTION

The present invention is directed to open bearing mud motor assembly used in down hole drilling to prevent loss of bearing assembly components and all components in the mud motor.

GENERAL BACKGROUND

In drilling operations, a drill string is maneuvered downhole to deepen a borehole for the purpose of reaching a desired production zone. The drill string generally includes a drill bit, a motor, and a string of drill pipe, or connected joints, directed downhole from the surface during the drilling process. The drill string can be rotated from the top of the string by a motor and/or the drill bit can be rotated by the motor at or near the bottom of the drill string. The drilling motors, more specifically the common "mud motor," tends to sustain the highly weighted load of the drill string. As such, the mud motor is prone to damage and/or disassembly during motor transmission failure, resulting in the downhole loss of components which have become separated from the motor assembly. Mud motors have been used in oil and gas drilling for many years, but continue to cause problems and delays in drilling operation during a failure or separation, referred to herein as a "failure event".

Mud motors include several components, each of which can be specifically modified for better drilling of select formations and other downhole conditions. The present invention relates to methods and apparatus for retaining motor and drill string components in the event of a failure of the mud motor at or above the drill bit and/or the separation of the components of the mud motor. Mud motors typically include a top sub for connecting the mud motor to the drill string, a power section that includes the rotor and stator, a transmission section that transmits eccentric power from the rotor to concentric power which usually includes one or more universal joints, a bearing assembly, and a bottom sub for connecting the mud motor to the drill bit. Separation and/or failure can occur at any part of the mud motor, but more often than not occurs in the transmission section, which can result in the separation of components in and below the transmission section. Components lost downhole greatly obstruct drilling operation, requiring project stoppage and costly recovery efforts. Therefore, a need exists for a catch assembly to prevent the loss of motor components during a motor transmission failure.

SUMMARY

The present invention provides a safety catch assembly disposed below the bearing stack in the transmission section of the mud motor to prevent loss of motor components during operation of a downhole drill string. The safety catch assembly can include one or more catch rings with spaced interference areas, or protrusions, about any one of its surfaces in the form of ridges, keys, and/or keyways. The ring(s) compress with the angular contact bearing stack and the outer housing in a drilling/completions mud motor/BHA (bottom hole assembly)—bearing assembly. The safety catch assembly ensures the inner drilling components do not drop out of the lower bearing assembly (LBA) if the bearing mandrel or anything above the LBA fails while drilling a well or completing a well.

The mud motor having the BHA compression safety catch assembly can include the radial bearing, the angular contact bearing stack, the outer bearing housing, and the torque member (can include a flow diverter or a torque nut). The radial bearing can include a lower inner radial bearing and an integrated end cap. The lower inner radial bearing is typically positioned around the outer diameter of the shaft and attached by threads to the bearing mandrel bit box. The lower inner radial bearing can have raised interference areas, the protrusions, spaced around the circumference thereof.

The angular contact bearing stack can include catch rings, generally at the bottom of the stack, with spaced protrusions, or interferences also referred to as "ridges", extending inward from the inner diameter surface. The interferences can be positioned such that they create channels that align or correspond with the protrusions of the lower inner radial bearing. In a two-ring assembly, one ring can have one or more keys and another ring can have one or more keyways. Alignment of the keys and corresponding keyways of the rings can result in the inward protrusions of the rings becoming misaligned forming a barrier, such that the inward protrusions restrict the rings from sliding off of the lower inner radial bearing through the lower inner radial bearing channels.

Additional aspects of the safety catch assembly disclosed herein can include methods of making and using the same in accordance with the foregoing aspects. It should also be noted that the safety catch assembly further encompasses the various possible combinations of the aspects and features disclosed herein.

BRIEF DESCRIPTION OF THE DRAWING(S)

The accompanying drawings illustrate various exemplary implementations and are part of the specification. The illustrated implementations are proffered for purpose of example, not for purpose of limitation.

DETAILED DESCRIPTION

The disclosed apparatus and method for using the apparatus relates to a safety catch ring assembly for use in a drilling mud motor. The mud motor generally includes a top sub for connecting the mud motor to the drill string, a power section that includes the rotor and stator, a transmission section that transmits eccentric power from the rotor to concentric power. The transmission section can include one or more universal joints, a bearing assembly, and a bottom sub for connecting the mud motor to the drill bit.

Figure 1A:
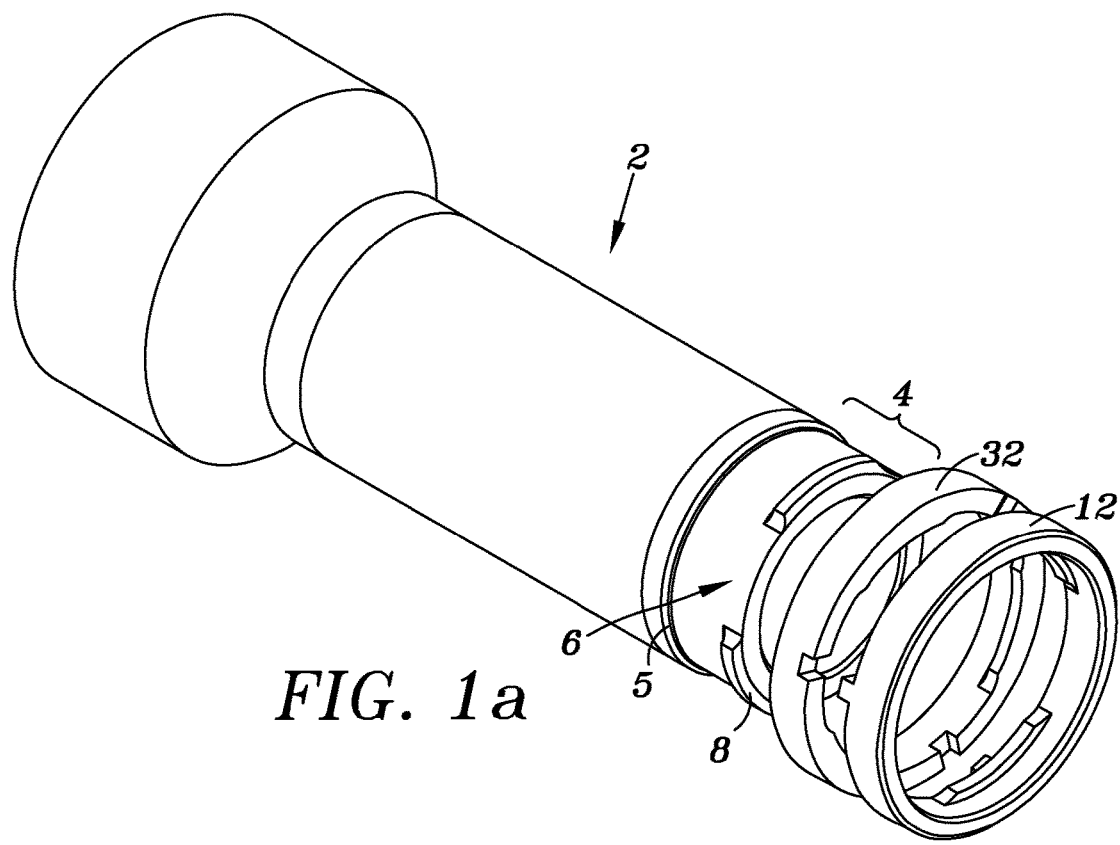
FIG. 1a depicts an exploded view of the lower inner radial bearing and catch ring assembly, as shown and described herein.

FIG. 1a depicts a lower inner radial bearing and two catch rings assembly, comprising the lower inner radial bearing 2, the first catch ring 12, and second catch ring 32. The first and second catch rings 12, 32 are configured to removably engage the catch ring retention zone 4 at a first end of the lower inner radial bearing 2.

Figure 1C:
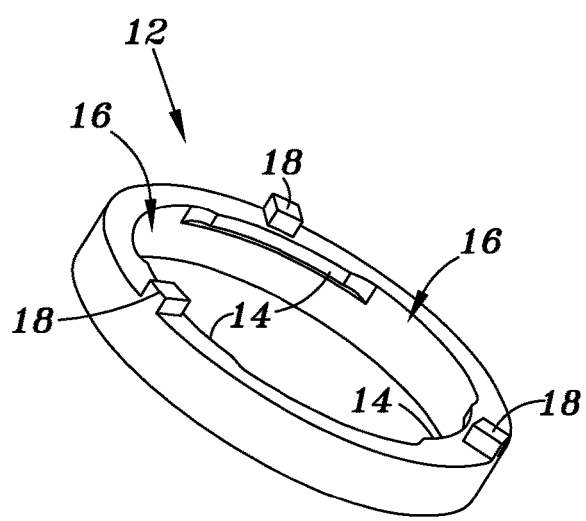
FIG. 1c depicts a perspective view of the first catch ring, as shown and described herein.
Figure 1D:
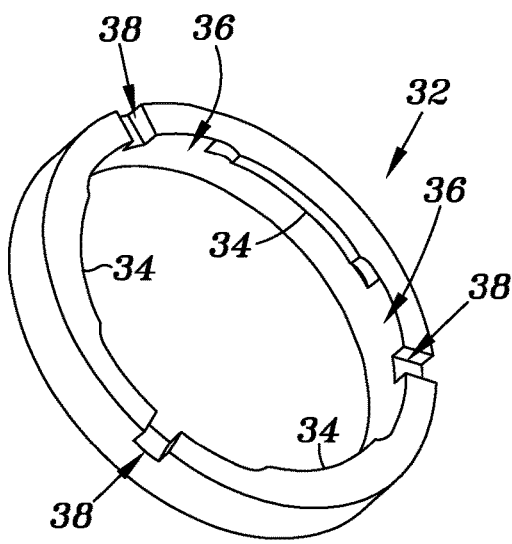
FIG. 1d depicts a perspective view of the second catch ring, as shown and described herein.
Figure 1B:
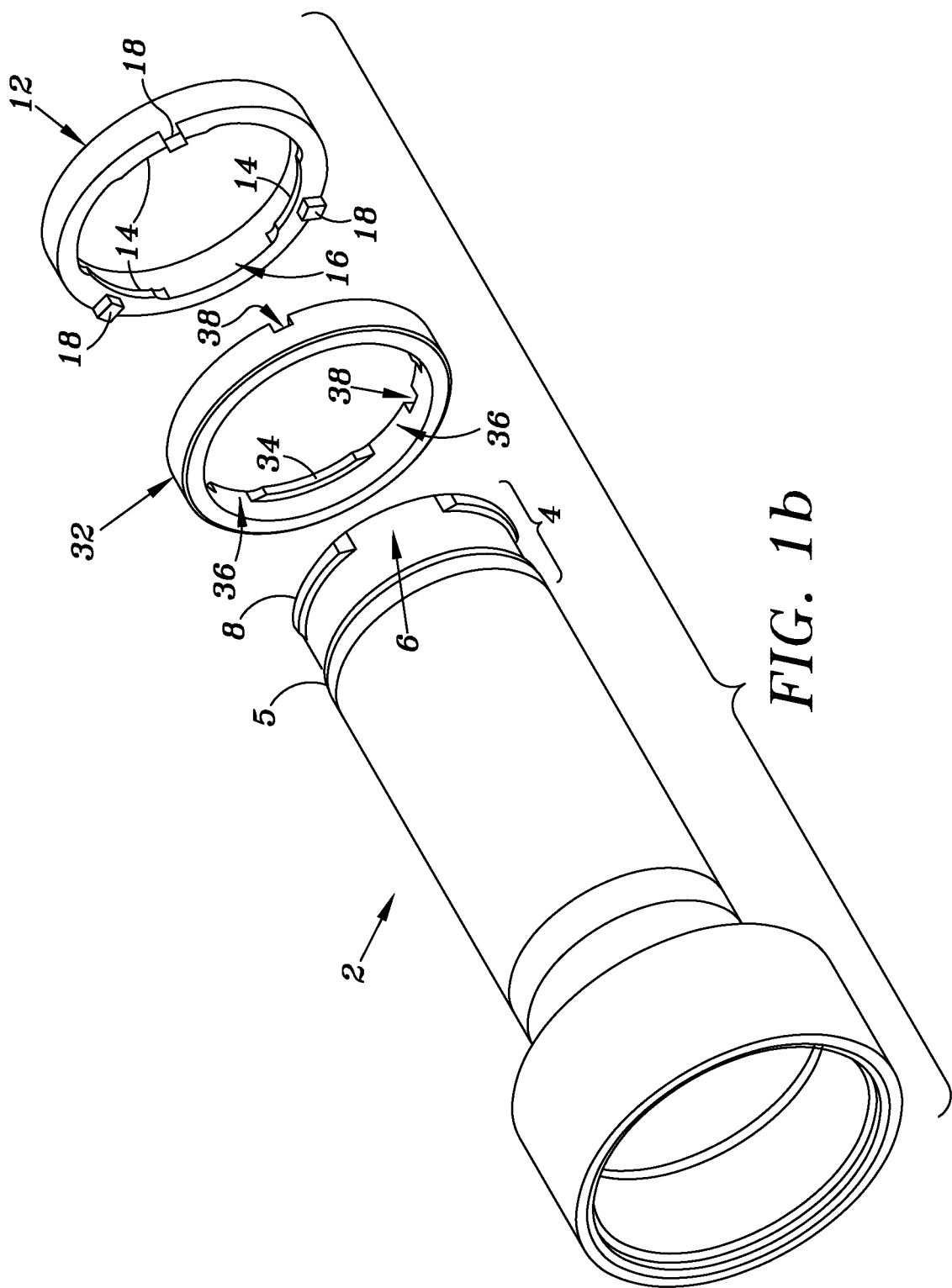
FIG. 1b depicts a perspective view of the lower inner radial bearing, as shown and described herein.

Referring to FIG. 1b, the catch ring retention zone 4 includes a specified zone of the outer diameter of the lower inner radial bearing 2 to provide an elongated sleeve portion about the outer diameter of the lower inner radial bearing 2 on which the catch rings 12, 32 can be disposed. As shown, the catch ring retention zone 4 includes a modified outer diameter, shown as an indented outer diameter, wherein the catch ring retention zone 4 has a first end, or proximal end, of a bearing shoulder 5 about the entire diameter and a second end, or distal end, having alternating channels 6 and shoulders 8. The shoulders 8 extend axially from the surface of the lower inner radial bearing.

The shoulders 8 can be spaced around the other outer diameter of the distal end of the lower inner radial bearing 2 and raised from the surface such that one or more channels 6 are created between the shoulders 8. The shoulders 8 will engage or abut the ridges of the catch rings 12, 32, discussed below, to prevent the catch rings 12, 32 from coming out of the catch ring retention zone 4 when the catch rings 12, 32 are in a locked configuration. As such, each shoulder 8 can be an elongated portion extending outward from the outer surface of the lower inner radial bearing 2 creating the channels 6 there between. As shown, the shoulders 8 can include the raised portion elongated in a generally linear shape extended about the circumference of the lower inner radial bearing 2 surface. In an alternative embodiment, the shoulders 8 can have a different shape or form from what is shown, so long as the shoulders 8 correspond to and provide adequate retaining means for the ridges and/or ridge barrier of the catch rings 12, 32.

Referring to FIGS. 1c and 1d, each catch ring 12, 32 can be generally cylindrical in shape and configured to fit on or about the outer diameter of the catch ring retention zone 4. Each catch ring 12, 32 can include one or more ridges 14, 34 raised from the inner surface, inner diameter, of the catch ring 12, 32. The ridges 14, 34 can create one or more grooves 16, 36 therebetween. The grooves 16, 36 should be sized and shaped such that the shoulders 8 of the lower inner radial bearing 2 can slide in, or slide through, the grooves 16, 36 during assembly.

Figure 1E:
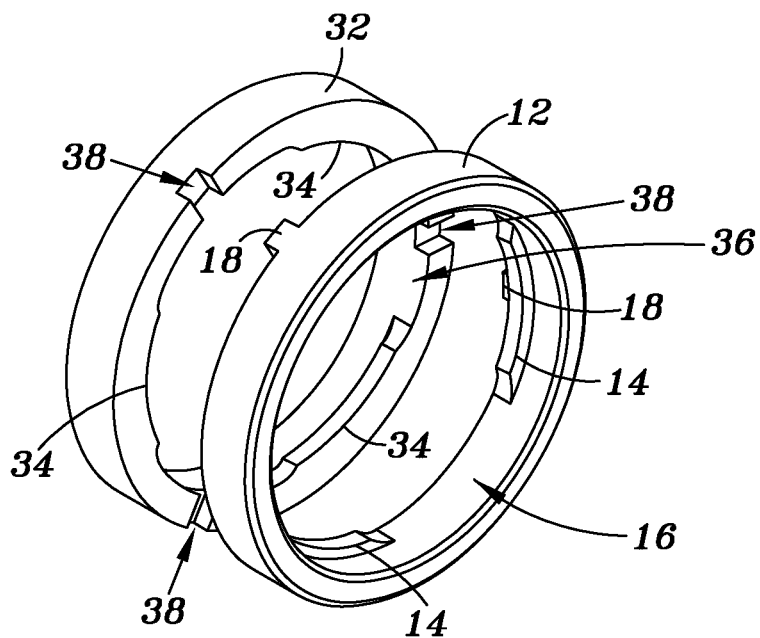
FIG. 1e depicts the first and second catch rings in an exploded configuration, as shown and described herein.
Figure 1F:
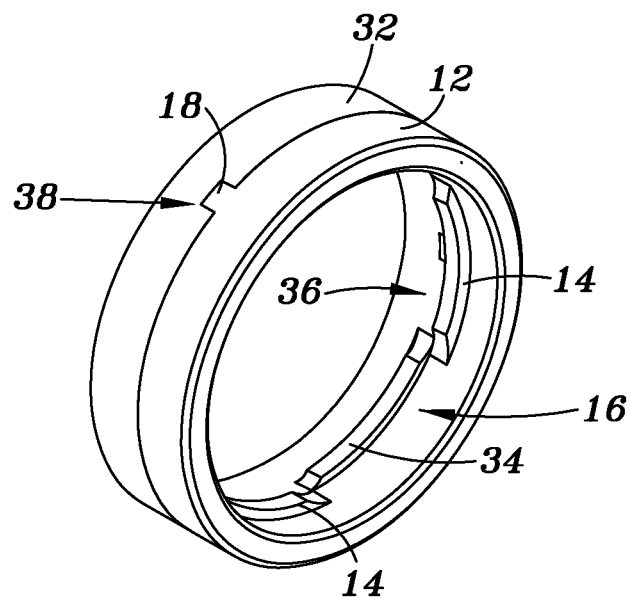
FIG. 1f depicts the first and second catch rings in an assembled configuration, as shown and described herein.

Referring specifically to FIGS. 1e and 1f, the first catch ring 12 can have one or more keys 18 disposed in its bottom surface, or first surface. The key(s) 18 can be a protrusion extending outwardly from the surface having one or a plurality of shapes. The second catch ring 32 can have one or more keyways 38 disposed on, or in, its top surface for receiving the keys 18 of the first catch ring 12. The orientation of the keys 18 and keyways 38 are shown to be generally square in shape, but can be any suitable shape and size such that when the keys 18 engage they keyways 38, the catch rings 12, 32 are locked together such that they cannot rotate in relation to one another. In an alternative embodiment, the first catch ring 12 can have one or more keyways, and the second catch ring 32 can have one or more keys. In other alternative embodiments, each catch ring can have keys and keyways disposed therein and the keys and keyways can extend from the top and bottom surfaces. In other alternative embodiments, the assembly can include more than two catch rings, with ridges, keys, and keyways disposed thereon according to the principles of this disclosure.

In an alternative embodiment, the key(s) 18 and keyway (s) 38 can have a configuration, size, shape, or engagement means beyond what is shown in this this disclosure, providing some rotational movement to one another, so long as the engagement of the catch rings 12, 32 results in the retention of the catch rings 12, 32 within the catch ring retention zone 4 and in such a way as to prevent the catch rings 12, 32 from leaving the catch ring retention zone 4 during operation of the mud motor.

When the catch rings 12, 32 are not connected to one another via the key(s) and keyway(s) engagement, they are generally considered to be in an unlocked position. The unlocked position of the catch rings 12, 32 is particularly important when placing the rings onto the catch ring retention zone 4 and removing the rings 12, 32 from the catch ring retention zone 4. The catch rings 12, 32 are unable to pass the shoulder(s) 8 and channel(s) 6 to enter or leave the catch ring retention zone 4 when the catch rings 12, 32 are connected to one another in the locked configuration. Generally, the catch rings 12, 32 are placed onto the catch ring retention zone 4 one at a time, but might at least be in the unlocked configuration to slide through the channels 6. The removability of the catch rings 12, 32 prevents the need to substantial modification to the lower inner radial bearing to contain a catch device. Once the catch ring retention zone is manufactured, catch rings can be interchangeable to the overall assembly.

As shown in FIG. 1f, the engagement of the keys 18 and keyways 38 results in a offset alignment of the ridges 14, 34 such that the combination of the ridges 14 of the first catch ring 12 and the ridges of the second catch ring 32 form a ridge barrier around the entire inner diameter of the combined first and second catch rings 12, 32. This ridge barrier acts to retain the catch rings 12, 32 within the catch ring retention zone 4 because the ridge barrier prevents the assembled catch rings 12, 32 from sliding through the channels 6 and shoulders 8 of the lower inner radial bearing 2. In this assembled configuration, the catch rings 12, 32 are still able to rotate about the outer diameter of the catch ring retention zone 4, but may not rotate in relation to one another. During a failure or separation event of the mud motor, the ridge barrier catching on the shoulder(s) 8 of the catch ring retention zone 4 keeps the components of the mud motor together and prevents the loss of those components in the hole, as the outer race of the bearing stack is caught by the catch rings 12, 32.

The key 18 and keyway 38 engagement as shown and described herein provides significant benefits to the user during assembly and disassembly of the safety catch bearing assembly or, generally, the lower components of the mud motor. There are no balls, no screws or pins, and no other locking devices needed. The catch rings are part of the angular contact bearing stack that compresses with the outer housing. The catch rings are not split (solid) so they are easy to rebuild or replace. Unless something in the bearing assembly fails and the catch rings are used or engaged to catch and secure any potentially separated components, they can be used repeatedly.

Figure 2:
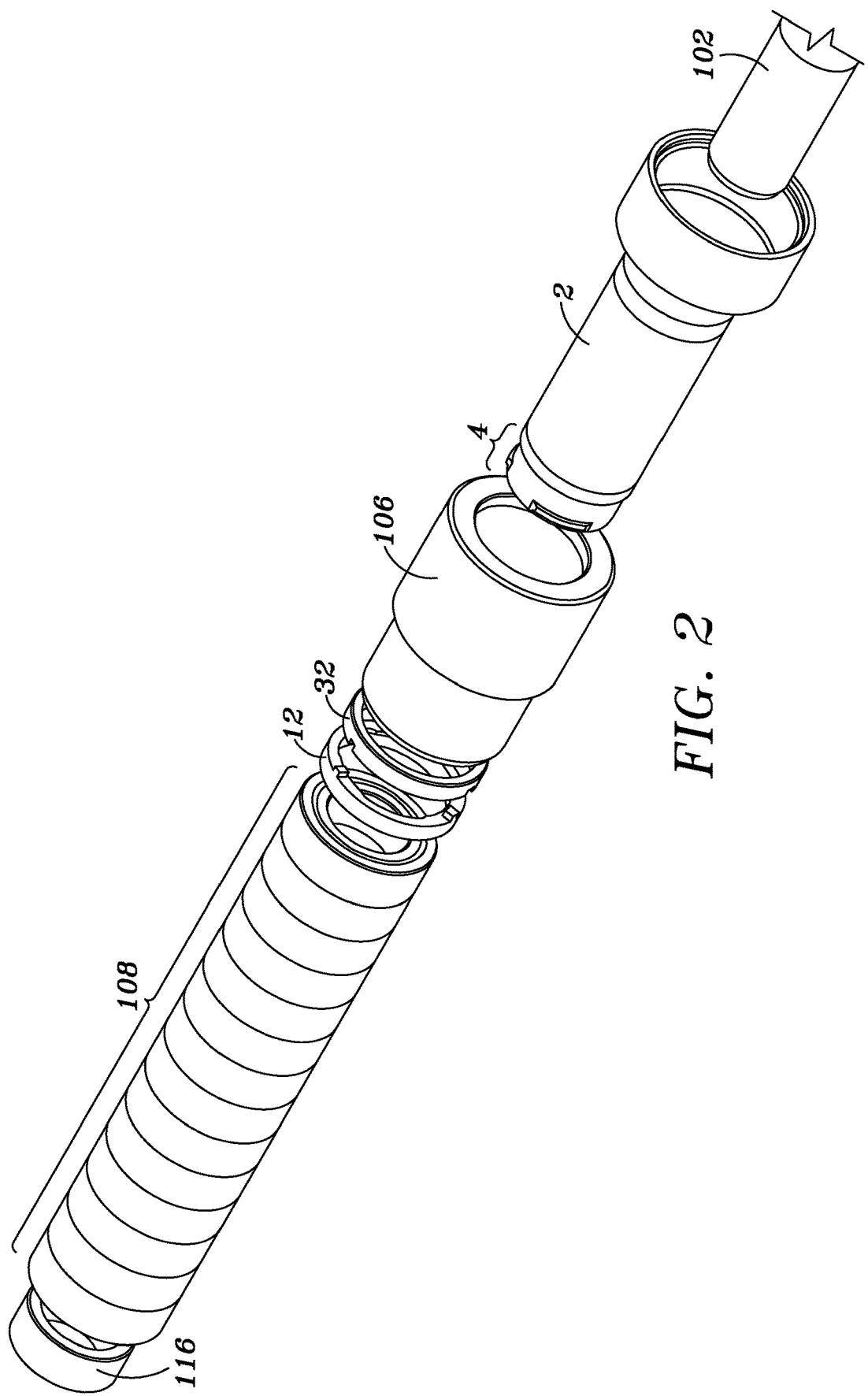
FIG. 2 depicts an exploded view of a lower bearing assembly for a mud motor, as shown and described herein.

FIG. 2 depicts an exploded view of a lower bearing assembly for a mud motor. The lower bearing assembly can include a bearing mandrel 102, the lower inner radial bearing 2 with the catch ring retention zone 4, an integrated end cap 106, the first catch ring 12, the second catch ring 32, a bearing stack 108, a torque member 116, or any combination thereof.

Figure 3:
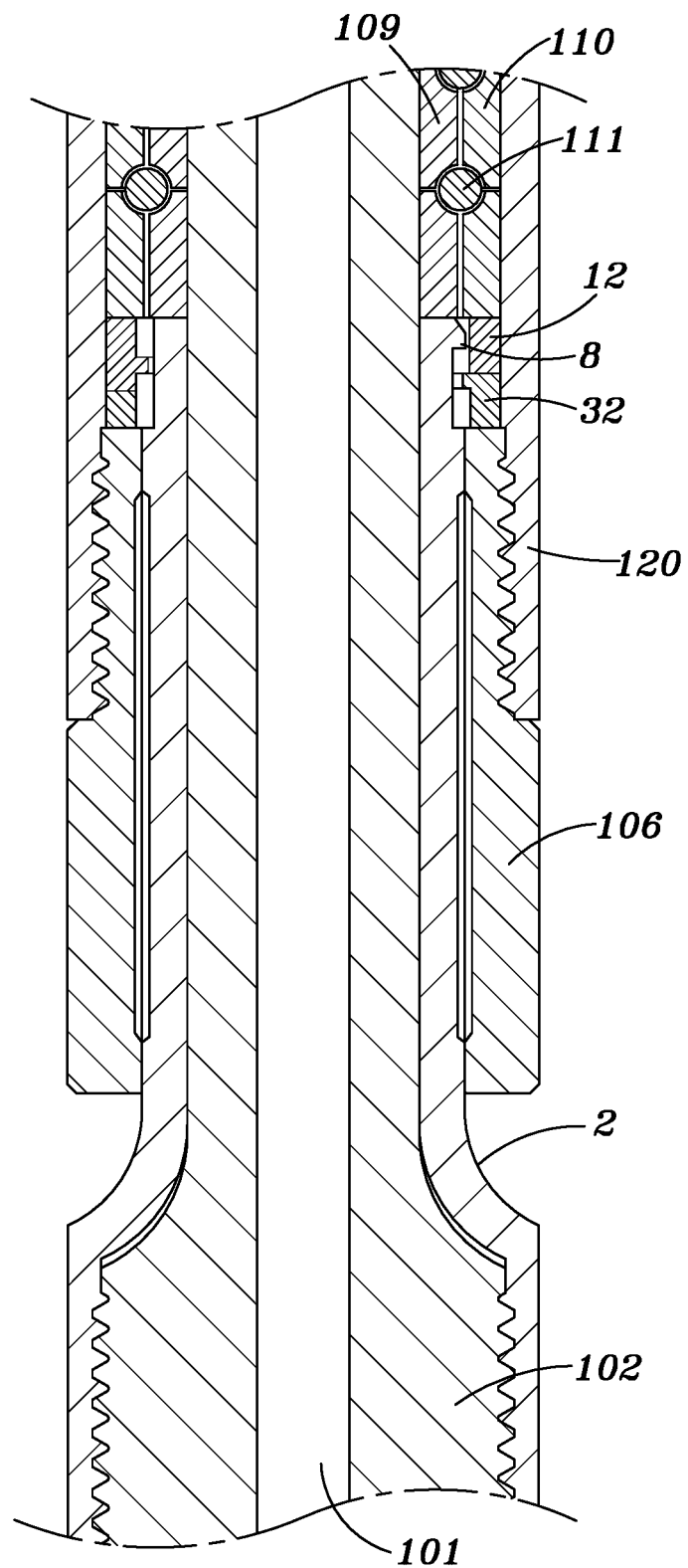
FIG. 3 depicts a cross-sectional view of the lower bearing assembly for a mud motor, as shown and described herein.

FIG. 3 depicts a cross-sectional view of the lower bearing assembly for a mud motor. For at least purposes of assembly, the bearing mandrel 102, having the bore 101 disposed centrally therethrough, can form the central axis of the lower bearing assembly. The lower inner radial bearing 2 can be disposed outside of the bearing mandrel 102. The integrated end cap 106 can then be positioned, or coupled, outside the elongated sleeve portion of the lower inner radial bearing 2 where the catch ring retention zone 4 is exposed and accessible at the top end thereof. The first and second catch rings 12, 32 can then be placed in the catch ring retention zone 4 by moving the second catch ring into position by sliding the ridges 14, 34 through the channels 6. Once the catch rings 12, 32 are moved into the catch ring retention zone 4, the catch rings can be moved to the locked position by way of the keys 18 engaging the keyways 38 so that the ridge barrier is formed and the first and/or second catch rings 12, 32 cannot rotate in relation to one another. In one or more embodiments, the first and second catch rings 12, 32 can then be welded (such as tack wielded) together to ensure the catch rings 12, 32 and/or the key(s)18/keyway(s)38 do not become disengaged.

The compression bearing stack 108 can include a plurality of angular contact bearings, each comprising an inner bearing race 109, an outer bearing race 110, and a plurality of bearing balls 111 seated therebetween. Once the compression bearing stack 108 is put in position, a torque member 116 can be affixed to the top end thereof to secure the inner races of the bearing stack, and a housing 120 can be affixed to the outer races. The first catch ring 12 is in direct contact with the lowest outer bearing race. The alignment of the catch rings with the outer bearing races 110 of the compression bearing stack 108 results in the alignment of force of the compression from the bearing stack 108, through the catch rings 12, 32, and to the lower inner radial bearing 2, and vice versa, during operation. This provides a tremendous benefit to the overall system because the catch rings will continue to function properly with the fluctuating compression forces sustained during operation, including the down thrust of the rotor, the hydraulic down thrust from bit pressure loss, and the reactive upward thrust from the applied WOB. Ideally, this catch ring assembly will not fail under compression.

The bearing stack disclosed herein refers to an angular contact bearing stack, having an inner race and an outer race completely independent from one another. Each outer race is independent of a corresponding inner race. With this compression bearing configuration, the catch rings 12, 32 and outer races can catch on the shoulders 8 of the lower inner radial bearing 2 independent of the inner races. The torque member 116 compresses the inner races 109 to the lower inner radial bearing 2 so that the inner races 109 can spin together with the lower inner radial bearing 2 as an entire piece. The outer race 110 aligns with, and can compress with, the first and second catch rings 12, 32, and generally refrains from rotating.

The two-race configuration is different from axial thrust bearings, which comprise stack of single layered rings having a track for housing balls between the rings in the stack. As such, the disclosed safety catch ring assembly could be modified to accommodate other bearing stack embodiments than are disclosed herein but would be optimal in a two-race configuration.

The housing 120 is connected with the catch rings 12, 32 and outer races 110 as an entire piece, it might be rotated (in drilling applications) or not rotated (in completion or in coil tubing). The housing 120 compresses the angular contact bearing stack 108 to ensure that the inner drilling components do not drop out of the lower bearing assembly if the bearing mandrel or anything above the lower bearing assembly fails while drilling a well or completing a well. More specifically, the alignment of the outer race 110 with the catch rings 12, 32 provides significant benefit to the system during a failure and/or separation event because the ridge barrier (formed of offset ridges 14, 34) of the locked catch rings 12, 32 prevent the components below the failure and/or separation from falling away from the mud motor and being lost downhole. Rather, the components are retained and are carried out of the hole during retraction of the drill string.

Although the present invention has been described with respect to specific details and embodiments, it is not intended that such description be regarded as limitations on the scope of the apparatus. It will thus be appreciated that those skilled in the art will be able to devise numerous alternative arrangements that, while not shown or described herein, embody the principles of the disclosure and thus are within its spirit and scope.

What is claimed is:
1. A safety catch assembly, comprising:
   a lower inner radial bearing comprising a catch ring retention zone;
   a first catch ring having an inner diameter with one or more ridges about the inner diameter; and
   a second catch ring having an, inner diameter with one or more ridges about the inner diameter, wherein the first and second catch rings are removably disposed in the catch ring retention zone, wherein the first and second catch rings disposed in the catch ring retention zone can engage one another by way of one or more keys and keyways such that a ride barrier is formed.
2. The safety catch assembly of claim 1, wherein the first and second catch rings comprise one or more of keys and keyways and wherein corresponding keys and keyways engage one another to provide a locked configuration.
3. The safety catch assembly of claim 1, wherein the first and second catch rings are secured to one another by way of keys and keyways.
4. The safety catch assembly of claim 3, wherein the first and second catch rings are removably disposed in the catch ring retention zone.
5. The safety catch assembly of claim 1, wherein the first and second catch rings are independently moved into the catch ring retention zone.
6. The safety catch assembly of claim 1, wherein the safety catch assembly aligns with an outer race of an angular contact bearing stack.
7. The safety catch assembly of claim 1, wherein the safety catch assembly is coupled to an angular contact bearing stack.
8. An assembly for a mud motor, comprising:
   a lower inner radial bearing comprising a catch ring retention zone;
   a first catch ring having an inner diameter with one or more ridges about the inner diameter and one or more keys about a bottom surface; and
   a second catch ring having an inner diameter with one or more ridges about the inner diameter and one or more keyways about a top surface, wherein the first and second catch rings are removably disposed in the catch ring retention zone and wherein the first and second catch rings lock to one another by way of the keys and keyways to form a ridge barrier.
9. The assembly of claim 8, wherein the catch ring retention zone comprises a sleeve portion and one or more shoulders defining one or more channels about a distal end.

10. The assembly of claim 9, wherein the locked position of the first, and second catch rings forms a ridge barrier and wherein the ridge barrier catches on the shoulders.

11. The assembly of claim 8, wherein the ridge barrier prevents first and second catch rings from exiting the catch ring retention zone.

12. The assembly of claim 8, wherein the locked catch rings catch on one or more shoulders of the lower inner radial bearing during a failure event.

13. The assembly of claim 8, wherein the first and second catch rings secure components of the mud motor during a failure event.

14. A bearing assembly for a mud motor, comprising:
a mandrel forming a central axis of the bearing assembly;
a lower inner radial bearing coupled to the mandrel, wherein the inner radial bearing comprising a catch ring retention zone having one or more shoulders and one or more ridges;
an integrated end cap disposed about the outside of an elongated sleeve portion of the lower inner radial bearing;
a first catch ring having an inner diameter with one or more ridges about the inner diameter; a second catch ring having an inner diameter with one or more ridges about the inner diameter, wherein the first and second catch rings interlock with one another in the catch ring retention zone forming a ridge barrier; and
a bearing stack coupled to the mandrel.

15. The bearing assembly of claim 14, wherein the first and second catch rings interlock by way of one or more keys and keyways.

16. The bearing assembly of claim 14, wherein the ridge bather catches on the one or more shoulders during a failure event.

17. The bearing assembly of claim 14, wherein the first and second catch rings retain the bearing stack during a failure event.

* * * * *